US 10,997,448 B2

(12) United States Patent
Bradski et al.

(10) Patent No.: US 10,997,448 B2
(45) Date of Patent: May 4, 2021

(54) ARBITRARY VISUAL FEATURES AS FIDUCIAL ELEMENTS

(71) Applicant: Matterport, Inc., Sunnyvale, CA (US)

(72) Inventors: Gary Bradski, Palo Alto, CA (US); Gholamreza Amayeh, San Jose, CA (US); Mona Fathollahi, Sunnyvale, CA (US); Ethan Rublee, Mountain View, CA (US); Grace Vesom, Woodside, CA (US); William Nguyen, Mountain View, CA (US)

(73) Assignee: Matterport, Inc., Sunnyvale, CA (US)

( * ) Notice: Subject to any disclaimer, the term of this patent is extended or adjusted under 35 U.S.C. 154(b) by 172 days.

(21) Appl. No.: 16/412,784

(22) Filed: May 15, 2019

(65) Prior Publication Data

US 2020/0364482 A1    Nov. 19, 2020

(51) Int. Cl.
| *G06K 9/00* | (2006.01) |
| *G06K 9/20* | (2006.01) |
| *G06K 7/14* | (2006.01) |
| *G06K 9/62* | (2006.01) |

(52) U.S. Cl.
CPC ......... *G06K 9/2054* (2013.01); *G06K 7/1417* (2013.01); *G06K 9/6261* (2013.01)

(58) Field of Classification Search
CPC .. G06K 9/2054; G06K 9/6261; G06K 9/4609; G06K 9/32; G06K 7/1417; G06T 7/0083; G06T 7/0028; G06T 7/0026; G06T 7/0024; G06T 7/0034; G06T 2207/10016; G11B 27/28

See application file for complete search history.

(56) References Cited

U.S. PATENT DOCUMENTS

| 5,500,906 | A   | * | 3/1996 | Picard .................. G06K 9/4609 382/220 |
| 6,681,151 | B1  |   | 1/2004 | Weinzimmer et al. |
| 6,722,567 | B2  | * | 4/2004 | Shaked ..................... G06K 7/14 235/462.01 |
| 6,751,352 | B1  |   | 6/2004 | Baharav et al. |
| 6,771,808 | B1  |   | 8/2004 | Wallack |
| 7,327,865 | B2  | * | 2/2008 | Fu ............................ G06K 9/32 378/28 |
| 8,094,870 | B2  |   | 1/2012 | Crookham et al. |
| 8,150,495 | B2  |   | 4/2012 | Edwards et al. |
| 8,462,380 | B2  | * | 6/2013 | Moore ...................... G06T 7/60 358/1.5 |

(Continued)

*Primary Examiner* — Amir Alavi
(74) *Attorney, Agent, or Firm* — Ahmann Kloke LLP (57) ABSTRACT

Systems and methods for registering arbitrary visual features for use as fiducial elements are disclosed. An example method includes aligning a geometric reference object and a visual feature and capturing an image of the reference object and feature. The method also includes identifying, in the image of the object and the visual feature, a set of at least four non-colinear feature points in the visual feature. The method also includes deriving, from the image, a coordinate system using the geometric object. The method also comprises providing a set of measures to each of the points in the set of at least four non-colinear feature points using the coordinate system. The measures can then be saved in a memory to represent the registered visual feature and serve as the basis for using the registered visual feature as a fiducial element.

20 Claims, 6 Drawing Sheets

(56) References Cited

U.S. PATENT DOCUMENTS

| | | | |
|---|---|---|---|
| 8,589,828 B2* | 11/2013 | Lee | G06F 30/398 |
| | | | 716/51 |
| 9,244,341 B2* | 1/2016 | Lee | G03F 1/70 |
| 9,280,694 B2 | 3/2016 | Stein | |
| 9,436,993 B1 | 9/2016 | Stolka et al. | |
| 10,197,987 B2 | 2/2019 | Battles et al. | |
| 10,620,530 B2* | 4/2020 | Yu | G03F 1/36 |
| 2015/0198887 A1* | 7/2015 | Yoo | G03F 7/20 |
| | | | 430/319 |
| 2018/0373950 A1 | 12/2018 | Gong | |
| 2020/0364482 A1* | 11/2020 | Bradski | G06K 9/2054 |

* cited by examiner

ARBITRARY VISUAL FEATURES AS FIDUCIAL ELEMENTS

BACKGROUND

Fiducials elements are physical elements placed in the field of view of an imager for purposes of being used as a reference. Geometric information can be derived from images captured by the imager in which the fiducials are present. The fiducials can be rigidly attached to the imager itself such that they are always within the field of view of the imager or placed in a locale so that they are in the field of view of the imager when it is in certain positions within that locale. In the later case, multiple fiducials can be distributed throughout the locale so that fiducials can be within the field of view of the imager as its field of view is swept through the locale. The fiducials can be visible to the naked eye or designed to only be detected by a specialized sensor. Fiducial elements can be simple markings such as strips of tape or specialized markings with encoded information. Examples of fiducial tags with encoded information include AprilTags, QR Barcodes, Aztec, MaxiCode, Data Matrix and ArUco markers.

Fiducials can be used as references for robotic computer vision, image processing, and augmented reality applications. For example, once captured, the fiducials can serve as anchor points for allowing a computer vision system to glean additional information from a captured scene. In a specific example, available algorithms recognize an AprilTag in an image and can determine the pose and location of the tag from the image. If the tag has been "registered" with a locale such that the relative location of the tag in the locale is known a priori, then the derived information can be used to localize other elements in the locale or determine the pose and location of the imager that captured the image.

Figure 1:
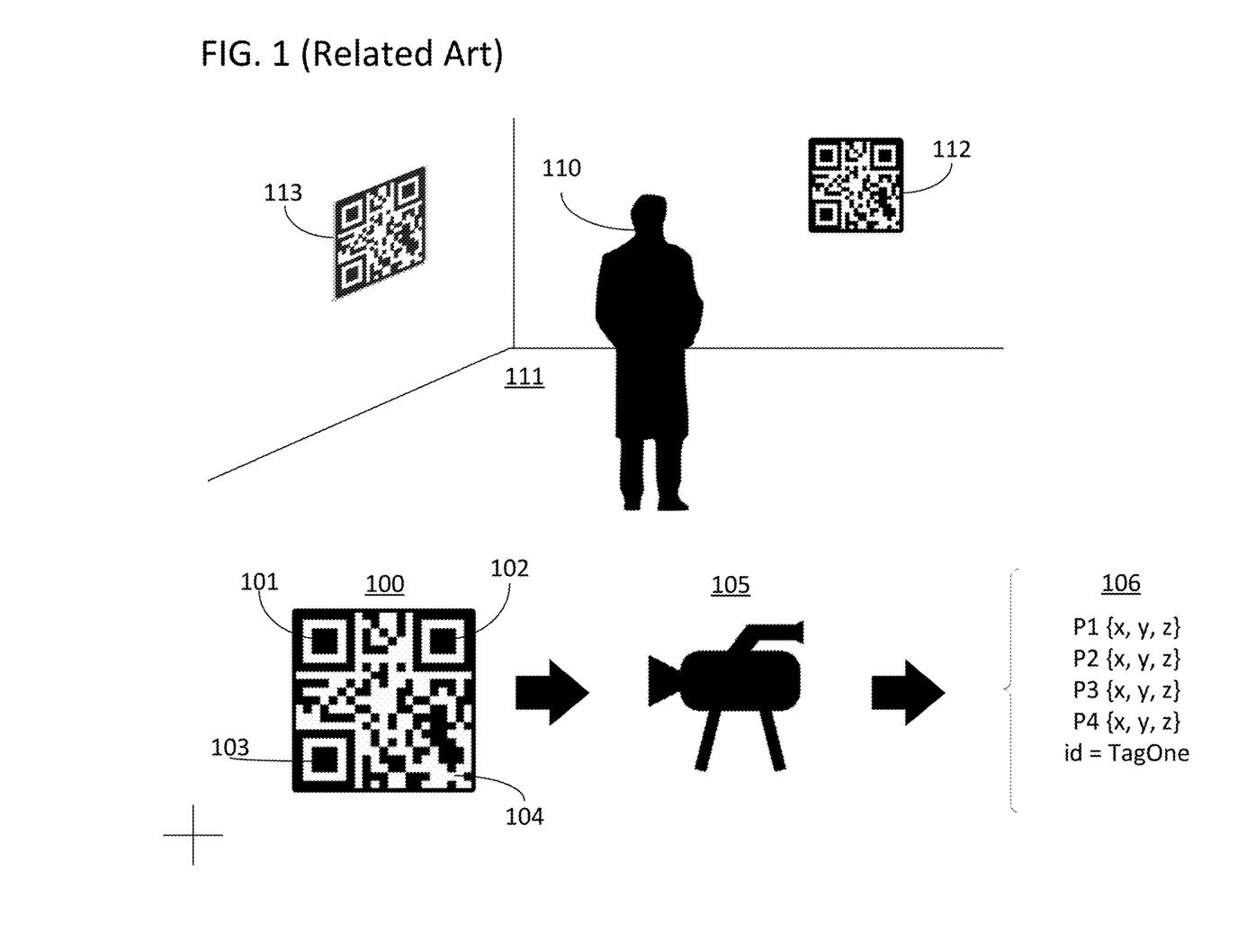
FIG. 1 is an illustration of a locale with fiducial elements in accordance with the related art.

FIG. 1 shows a fiducial element 100 in detail. The tag holds geometric information in that the corner points 101-104 of the surrounding black square can be identified. Based on prior knowledge of the size of the tag, a computer vision system can take in an image of the tag from a given perspective, and the perspective can be derived therefrom. For example, a visible light camera 105 could capture an image of fiducial element 100 and determine a set of values 106 that include the relative position of four points corresponding to corner points 101-104. From these four points, a computer vision system could determine the perspective angle and distance between camera 105 and tag 100. If the position of tag 100 in a locale were registered, then the position of camera 105 in the locale could also be derived using values 106. Furthermore, the tag holds identity information in that the pattern of white and black squares serves as a two-dimensional bar code in which an identification of the tag, or other information, can be stored. Returning to the example of FIG. 1, the values 106 could include a registered identification "TagOne" for tag 100. As such, multiple registered tags distributed through a locale can allow a computer vision processing system to identify individual tags and determine the position of an imager in the locale even if some of the tags are temporarily occluded or are otherwise out of the field of view of the imager.

FIG. 1 further includes a subject 110 in a set 111. As illustrated, fiducial elements 112 and 113 have been placed in set 111 to serve as references for facilitating the kinds of image processing techniques mentioned above. However, as the tags have been captured along with the scene, they will need to be removed via post processing before the scene is in final form. Furthermore, if set 111 is being used for a live performance, the presence of the tags could appear unprofessional and be distracting for the audience.

SUMMARY

This disclosure includes systems and methods for generating fiducial elements using arbitrary visual features. The arbitrary visual features can be any visual element with sufficient texture information. They can be natural images or objects introduced into a locale for purposes of serving as fiducials, or natural images or objects already present in the locale. They can also be natural images or objects naturally associated with or introduced to any subject. In specific embodiments of the invention, the visual features are natural images. In specific embodiments of the invention, the visual features include a logo or other pattern that is repeatedly presented in a given locale. The methods of generating a fiducial element from an arbitrary visual feature can be referred to herein as "registering" that visual feature. Once the visual feature is registered, it can be used as a fiducial element for any of the processes described in the background above. However, if selected properly, the fiducial elements generated in accordance with specific embodiments of the invention disclosed herein will not require removal in post processing or be visually obtrusive to an observer of the locale or subject on or around which the fiducial element are located.

Registered visual features can be deployed in a given locale as a fiducial element for capture by an imager operating in that locale. Locales in which the fiducial elements are deployed can include a set, playing field, race track, stage, or any other locale in which an imager will operate to capture data inclusive of the data embodied by the fiducial element. The locale can include a subject to be captured by the imager along with the fiducial elements. The locale can host a scene that will play out in the locale and be captured by the imager along with the fiducial elements. The registered visual features can also be deployed on a given subject as a fiducial element for capture by an imager serving to follow that subject. For example, the registered visual features could be on the clothes of a human subject, attached to the surface of a vehicular subject, or otherwise attached to a mobile or stationary subject. As the visual features may already be features of the locale or subject before they are registered, "deploying" the visual feature does not necessarily require the physical addition of the registered visual feature to the locale or subject so much as simply registering and using the visual feature during capture.

In a specific embodiment of the invention a method is disclosed. The method comprises aligning a geometric reference object and a visual feature and capturing, while the geometric reference object and the visual feature are aligned, an image of the geometric reference object and the visual feature. A non-limiting example of a geometric reference object that can be used in specific embodiments of the invention is an AprilTag. A non-limiting example of a visual feature that can be used in specific embodiments of the invention is a logo. The method also comprises identifying, in the image of the geometric reference object and the visual feature, a set of at least four non-colinear feature points in the visual feature. The method also comprises deriving, from the image of the geometric reference object and the visual feature, a coordinate system using the geometric object. The method also comprises providing a set of measures to each of the points in the set of at least four non-colinear feature points using the coordinate system. The measures can then be saved in a memory to represent the registered visual feature and serve as the basis for using the registered visual feature as a fiducial element.

In specific embodiments of the invention, a visual feature that has been registered using a method in accordance with the specific embodiments described in the prior paragraph can then be deployed for use as a fiducial element. In a specific embodiment of the invention, a method of using a registered visual feature is disclosed. The method comprises placing the visual feature in a locale or on a subject. The method also comprises capturing an image of the visual feature in the locale and/or on the subject. The method also comprises deriving, from the image of the visual feature in the locale and using the set of measures, a pose of the visual feature in the locale or the imager in the locale.

DETAILED DESCRIPTION

Specific methods and systems associated with visual features in accordance with the summary above are provided in this section. The methods and systems disclosed in this section are non-limiting embodiments of the invention, are provided for explanatory purposes only, and should not be used to constrict the full scope of the invention.

Figure 2:
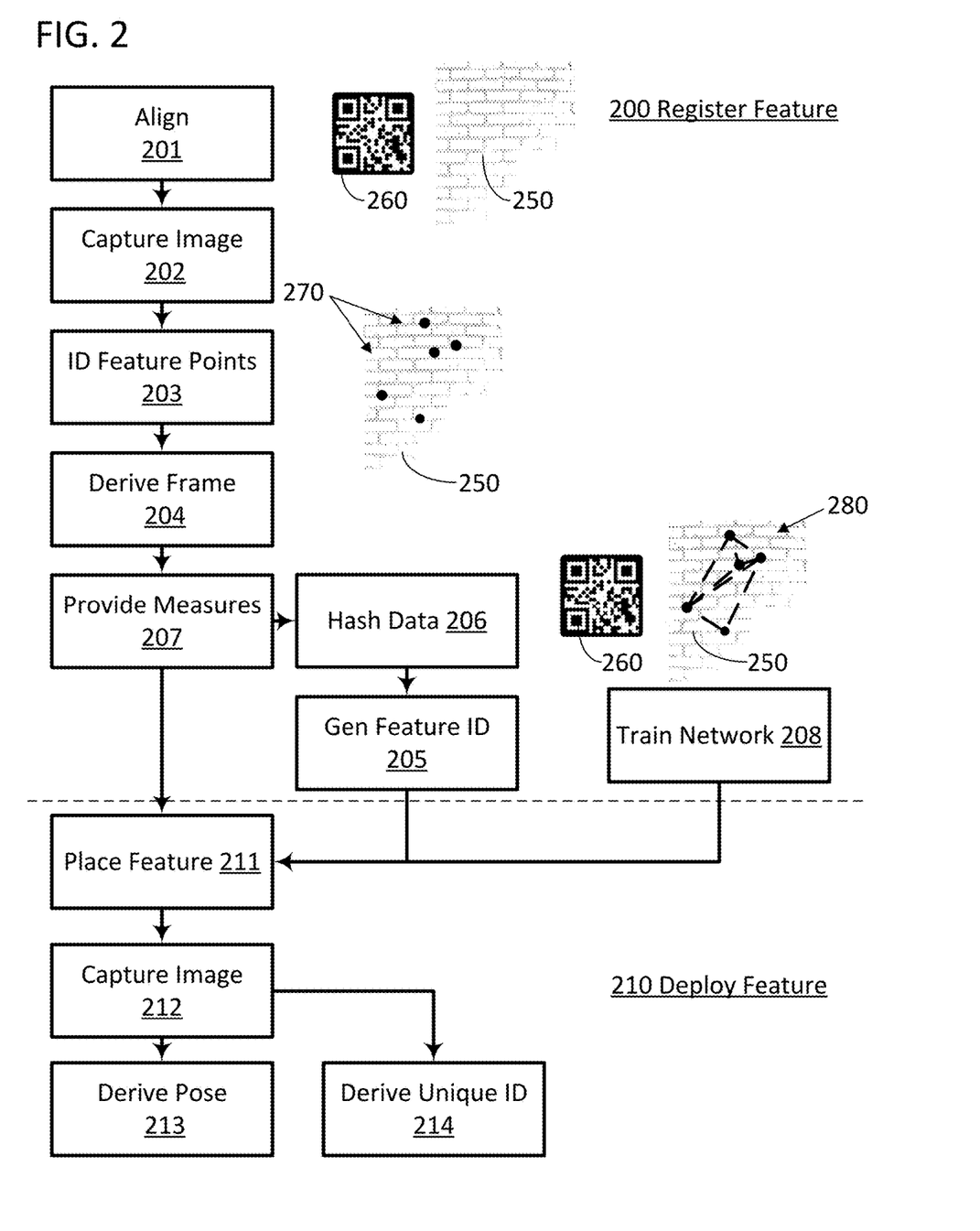
FIG. 2 is a flow chart of a set of methods for registering and deploying arbitrary visual features as fiducial elements in accordance with specific embodiments of the invention.

FIG. 2 illustrates a flow chart for a set of methods that are in accordance with specific embodiments of the invention. The flow chart includes a first section 200 in which a visual feature is registered for use as a fiducial element and a second section 210 in which the visual feature is deployed for such use. The flow chart includes the example of a visual feature in the form of a distinctively textured section of a brick wall 250 and a geometric reference object in the form of a QR code tag 260. However, the approaches disclosed herein can be used with a broad array of visual features and geometric reference objects in various combinations.

In specific embodiments of the invention, any arbitrary visual feature having sufficient texture or depth information can be registered as a fiducial element. The visual features can include natural images that can be introduced to a given locale or natural features of the locale itself. The visual features can be two-dimensional surfaces or three-dimensional objects. The natural images can include posters or banners with advertisements, team insignias, or company logos. The natural features can include distinctive surfaces such as brick wall 250 or three-dimensional objects that are already in the locale such as furniture or natural landmarks. In specific embodiments, set pieces can be introduced to a locale specifically because they have sufficient texture information for a given application but otherwise appear to be a natural element of the locale (e.g., a wood table with a distinctive wood grain deployed on the set of a family dining room). The amount of texture or depth information that is sufficient for registering a visual element will depend on the implementation and will be addressed in more detail below.

In specific embodiments of the invention, the geometric reference object can take on different forms. The geometric reference objects can include fiducial elements such as AprilTags, ArUco markers, circular patterned fiducial markers, and any two-dimensional or three-dimensional fiducial element used in the robotics, computer vision, and augmented reality fields. In general, any geometric reference object from which an n-dimensional geometry can be derived could be utilized as the geometric reference object in accordance with this disclosure where "n" is the number of dimensions of the visual feature being registered. For example, in the case of a Euclidean geometry with a two-dimensional visual feature, a common L-square carpenter's ruler with a known handle length could serve as the geometric reference object. In specific embodiments, the geometric reference object could be a customized measuring tool designed to stick temporarily to surfaces on a set. The device could involve one or more integrated levels for aligning the geometric object with a visual feature in accordance with specific embodiments of this disclosure. However, geometric objects in the form of AprilTags and other fiducial elements that are in common use are beneficial because there are readily available software tools for segmenting them from captured images and deriving location and pose information from the segmented information.

In specific embodiments of the invention, a grid of geometric reference objects will be used as opposed to a single reference object. For example, a grid of AprilTags. Although a single AprilTag of known size could be sufficient in some applications, the use of additional tags will enable the system to screen out errors due to nonidealities of an imager such as image noise or the size of the pixel receptors of an imager. A grid of tags can provide an accurate reading because there are numerous edges and corners to be detected and a potential bias, owing to tag edges and corners being located in sub-pixel locations, can be screened out in the next row or column of the grid. Furthermore, different sets of points derived from the geometric object can be selected and utilized to determine measures and or camera poses and the best consensus can be used to define the selected points using a random sample consensus (RANSAC) approach.

Flow chart section 200 begins with a step 201 of aligning a geometric reference object with a visual feature. This step can include placing the geometric reference object proximate to the visual feature without any appreciable degree of attention placed on the specific manner in which the visual feature is physically aligned with the geometric reference object so long as the geometric reference object and visual feature are aligned in at least one dimension. For example, both the geometric reference object and the visual feature could be placed on the same surface. This could involve placing both on the floor or adhering the reference object to a wall or other surface on which the visual feature was already located. In the illustrated situation of FIG. 2, QR code tag 260 is effectively aligned with visual element 250 in that QR code tag 260 is taped or otherwise adhered to the wall such that both the visual element and geometric reference object lie in the same plane.

In other embodiments, such as those in which the geometric references object and/or the visual feature are three-dimensional, alignment can involve aligning an alignment feature of both the geometric reference object and the visual feature to a common plane. The plane could be a plane normal to a surface on which both elements were placed. For example, in the case of a three-dimensional reference object and visual feature, the aligning step could be conducted by placing the three-dimensional object and the visual feature proximate to each other, on a surface, and with a first alignment feature of the three-dimensional object and a first alignment feature of the visual feature located on a plane that is normal to the surface. The alignment of the two elements along the common plane and the surface would thereby provide alignment information for a three-dimensional alignment of the two.

Alignment features used in accordance with specific embodiments of the present invention can take on various forms. For example, the alignment features could be an inherent physical characteristics of an element such as the center or edge of an object. As another example, the alignment features could be a visual aspect of an object such as the center line of a table. The alignment features could also be added to an object such as by marking the object with a pen or tape. The alignment features should generally be selected such that they allow a user to intuitively and easily align the geometric reference object and visual feature via visible inspection and minimal effort.

Figure 3:
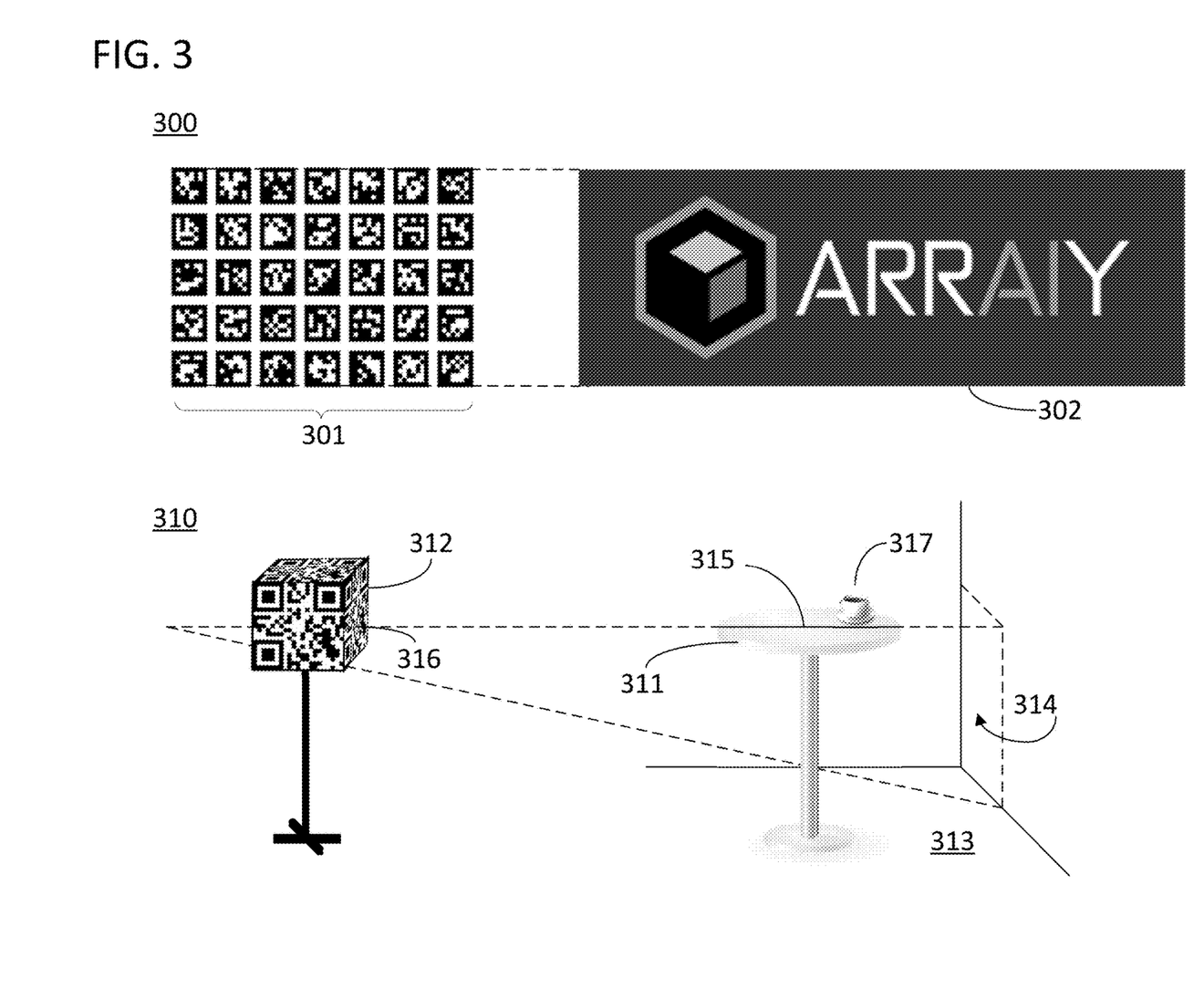
FIG. 3 is an illustration of two potential implementations of the aligning step in the flow chart of FIG. 2 that are in accordance with specific embodiments of the invention.

FIG. 3 provides two explicit examples 300 and 310 of the result of an execution of step 201 in accordance with specific embodiments of the present invention in which the alignment is conducted manually by a user. In example 300, a set of AprilTags 301 has been placed next to a company logo 302 on the floor. For example, the company logo could be on a banner placed on the floor next to the set of AprilTags. The company logo 302 and set of AprilTags 301 are aligned in this image because they are located in the same two-dimensional plane, defined by the floor of the locale in which image 300 was captured. In example 310, table 311 and reference object 312, in the form of a cube with each face displaying a separate AprilTag, are aligned because they are placed on the same surface 313 and because an alignment feature of each element has been placed in a common plane 314. In the illustrated case, the centerline of table 315 and a reference point 316 on reference object 312 have been placed in common plane 314. Common plane 314 is normal to surface 313. Table 311 includes an alignment feature in the form of centerline 315, and it also includes a symmetry reduction feature in the form of cup 317. Centerline 315 is visible to the naked eye and physically located on table 311 to assist a user in conducting step 201. Symmetry reduction features for arbitrary visual features, such as cup 317, are important in certain embodiments as described below.

Flow chart section 200 continues with a step 202 of capturing an image. The image can be captured by an imager and include the geometric reference object and the visual feature as aligned in step 201. The imager can be a single visible light camera such as a standard hero camera used in professional motion picture capture applications. The imager can also include an auxiliary or witness camera. The witness and hero cameras can both be visible light cameras and can be used in combination in stereo fashion to obtain depth information such that the image can included depth information derived from the two cameras. Any number of witness cameras can be used along with the hero camera. The imager can also include a dedicated depth sensor for extracting depth information for the image in combination with a visible light imager for collecting texture information. All of the components of the imager such as a hero camera and any auxiliary witness cameras or depth sensors can be attached to a single rig such that they have an overlapping field of view and can all be easily directed towards the aligned visual feature and geometric reference object at the same time. In specific embodiments of the invention, the image can consist solely of depth information, solely of texture information, or a combination of both depending upon the imager used. The imager can capture light of any spectrum including visible, ultraviolet, or infrared light.

Flow chart section 200 continues with a step 203 of identifying, in the image captured in step 202, a set of at least four non-colinear feature points in the visual feature. The four non-colinear feature points will be used to define a perspective view of a plane. Four points are needed to define the plane in three-dimensional space if they are provided in a two-dimensional image. If only three points are provided in the form of x- and y-coordinates in an image, the three points are not sufficient to define the plane given that the perspective will alter the relative value of those three coordinates without an additional known variable to tack down their relationship. The plane can be the plane in which a two-dimensional visual feature is positioned in a locale. In specific embodiments of the invention, an M×N grid of feature points will be associated with the visual feature through the execution of step 203. The grid will include four corners and a center point.

Step 203 is illustrated by the discovery of five feature points 270 in an image of wall 250. The feature points can be found using standard computer vision image processing feature finding algorithms or a trained network. The network can be trained to identify feature points that maximize detectability of those feature points from different perspectives, distances, changes in lighting conditions, and other variations between when the image is captured, such as in step 202, and when the visual feature is deployed, such as in flow chart section 210.

In specific embodiments of the invention, step 203 can be conducted by a system that combines standard computer vision image processing feature finding algorithms to select a large set of candidate points, and a trained network to cull the list of candidate points for purposes of selecting the feature points that will maximize detectability and the accurate provisioning of geometric and/or identify information from the visual feature at a later time during deployment. The trained network could be part of a network used when the visual features are deployed.

The visual feature should have sufficient textual or depth information in order for distinctive feature points to be discovered for this purpose. The textual or depth maps should accordingly have high entropy, low repeatability, and low internal correlation, and be asymmetrical. For example, the texture map could be an asymmetric two-dimensional texture map with a high degree of edginess per unit area and little repetition. If recognition of the visual features is to rely on texture information the visual feature could be a two-dimensional object with a non-repeating texture map. For example, the visual feature could be an asymmetrical picture where it is not possible to draw a line of symmetry through the picture. This aspect of the visual feature will assure that an imager is able to find enough feature points to precisely derive the position of the imager without ambiguity. The feature points should also be stable in the sense that they do not change position as a capture proceeds. For example, a crumpled bed sheet might have many of the features described above, but the feature points of the sheet would be likely to disappear or move slightly relative to one another such that they no longer provide sufficient reference information for a priori registration and later deployment.

Figure 4:
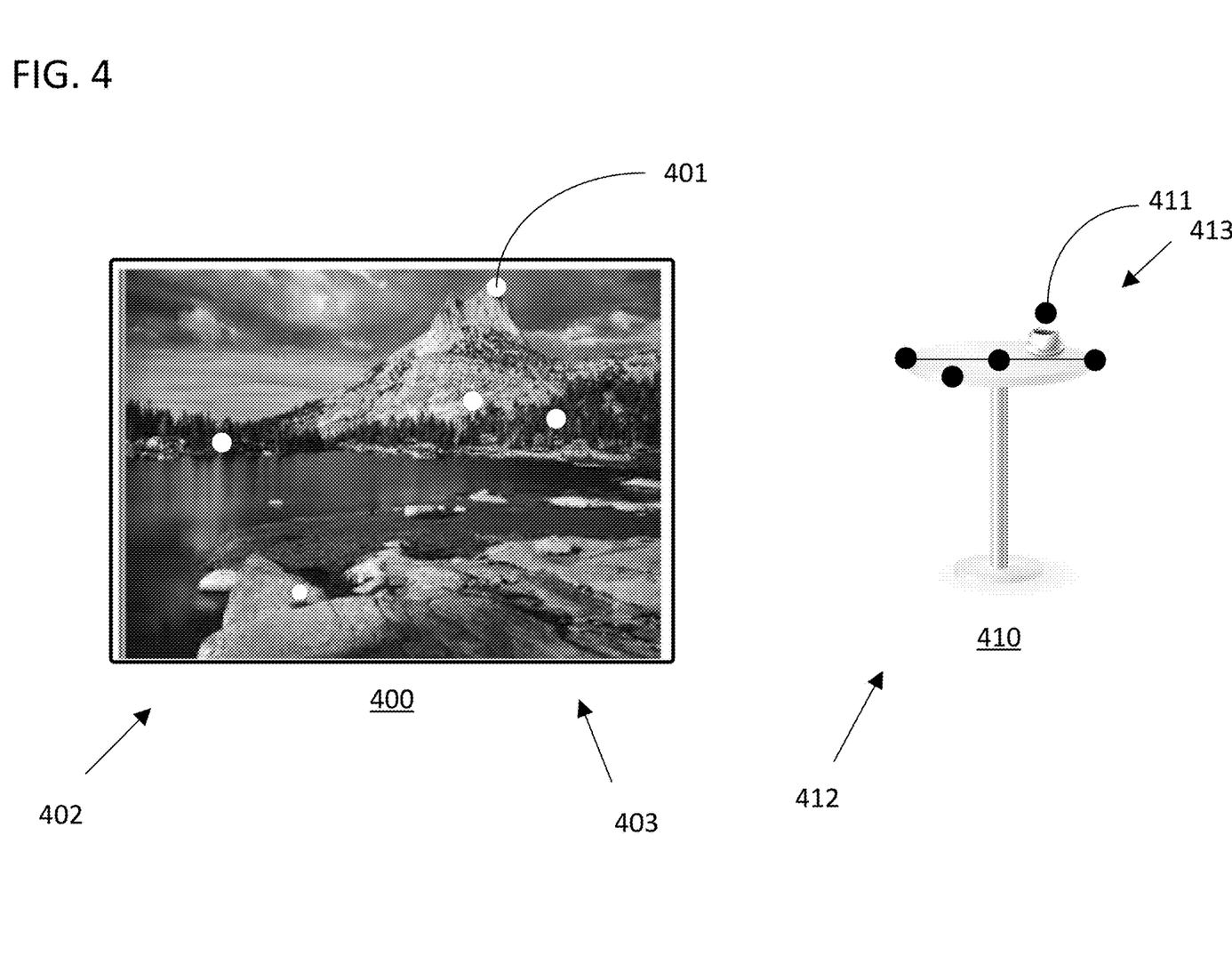
FIG. 4 is an illustration of two potential implementations of the feature point identification step in FIG. 2 in accordance with specific embodiments of the invention.

FIG. 4 provides two examples of sets of feature points that could be extracted from a visual feature. Visual feature 400 is a two-dimensional natural image in the form of a framed picture of a distinctive landscape. A set of feature points that could be derived therefrom include sample point 401 and four other points. Visual feature 400 is particularly useful because there is a high degree of texture variation in the image and no symmetry such that viewing the visual feature from either perspective 402 or 403 would not result in an ambiguous detection of feature points. Visual feature 410 is three-dimensional table with a center line. However, this would not be ideal for an execution of step 203 because of the symmetry of visual feature 410 along that center line. If an imager were to detect visual feature 410 from perspective 412 it would not be able to distinguish if it was viewing the visual feature from perspective 413. As a result, a symmetry reduction element, in this case a coffee cup, has been added to the table in order for a sufficient set of feature points, such as feature point 411, to be derived.

The system used to identify the feature points in step 203 could be designed to alert a user that insufficient feature points are available with any given visual feature such that a different visual feature should be selected. For example, if the texture map of wall 250 did not have enough variation (e.g., it was a perfect uniform brick wall with near-identical bricks) then the system could inform that user that the wall would not be able to be registered as a visual feature for use as a fiducial element. If recognition of the visual feature was to rely on depth information, the visual feature could be a three-dimensional object with a nonrecurrent depth map. For example, the visual feature could be an asymmetrical piece of furniture where it would not be possible to draw a plane of symmetry through the object. As stated previously, users could be provided with the option to introduce symmetry reducing elements, such as the cup 317 on table 311 in order to allow a set piece to serve as a registered visual feature. The system could reject potential visual features based on a set threshold requirement for a degree of texture variation and could also be augmented with information concerning a texture map of the locale in general such that visual features with texture or depth maps that were correlated too closely with other portions of the locale would be rejected.

Flow chart section 200 continues with a step 204 of deriving from the image or the geometric reference object and the visual feature, a coordinate system using the geometric object. This step involves using a prior information regarding the geometric object to generate an ordinal reference frame from the image. In one example, the geometric reference object could be a physical ruler with standard units of distance demarked thereon such that image processing conducted on the image could identify unit steps for the coordinate system. In another example, the geometric reference object could have specific features such as its length or width that were known a priori from which unit steps for the coordinate system could be derived. Furthermore, the axes of the coordinate system could be derived either randomly, or they could be based on the position of certain features of the geometric object. For example, if the reference geometric object were two-dimensional and included a right angle, the right angle could be used to define the x and y axes of the coordinate system. In the case of a geometric object in the form of a standard fiducial such as an AprilTag, the coordinate system could be derived using commonly available algorithms for determining the pose or position of such fiducials and then basing the coordinate system off that pose. A geometric reference object with a known physical size bounded by four detectible points in the image could provide the basis for a three-dimensional coordinate system.

Flow chart 200 continues with a step 207 of providing a set of measures to each of the points in the set of at least four feature points identified in step 203 using the coordinate system derived in step 204. The measures could be relative Euclidean measures. The measures could be distances between the four points. There are numerous ways by which the measures could be provided. For example, the measures could be assigned to each of the four points and include the distance to each of the other points in the set. Alternatively, the distances to at least two other points in the set could be provided to each point. Alternatively, a distance to a common point in the set could be assigned to each point with the common point being assigned a distance of zero. Regardless of how the measures are assigned as long as the system is able to derive the expected apparent distance between each point in an image taken from any perspective in which all the points are present will suffice for purposes of conducting step 207 with a two-dimensional visual feature.

Figure 5:
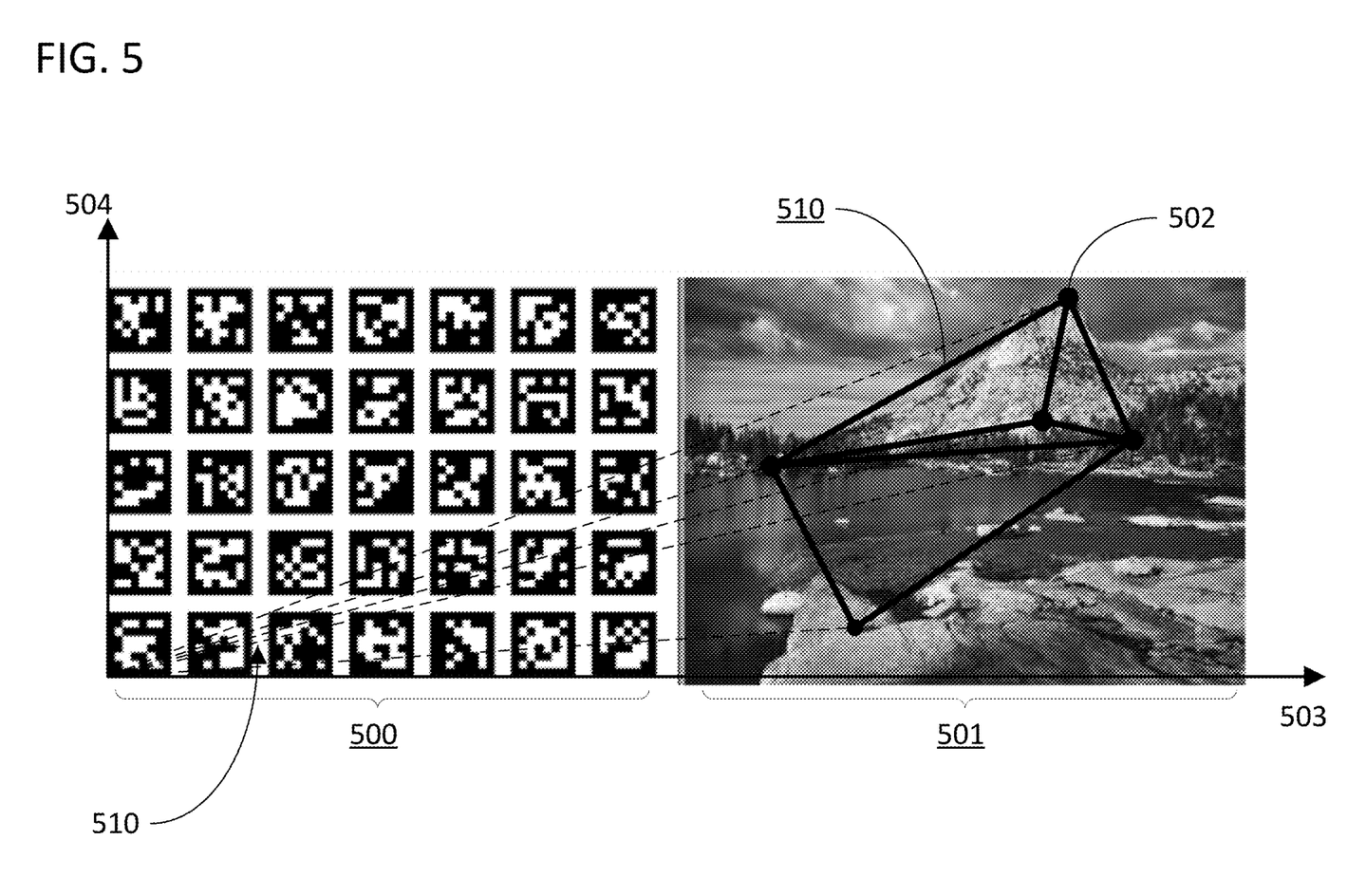
FIG. 5 is an illustration of a potential implementation of the measure provisioning step in FIG. 2 in accordance with specific embodiments of the invention.

FIG. 5 provides illustrates a specific implementation of step 207. In FIG. 5 an image has been captured which includes a set of geometric reference objects 500 aligned with a visual feature 501. As shown, feature points such as feature point 502 have already been identified in visual feature 501 and a set of axes 503 and 504 have already been derived from the geometric reference objects 500. The axes are ordinal with unit sizes derived from a priori available information regarding the geometric reference objects 500 or information encoded in the reference images. In the illustrated case, the distance from the origin of the coordinate frame is them determined for each of the points and measures, such as measures 510 are derived therefrom in order to register the visual feature 501 for use as a fiducial element.

Flow chart section 200 continues with an optional step of hashing data associated with the measures 206 and a step of generating a feature ID for the visual feature 205. This step is optional in that it is only required if the visual feature is being registered for an application in which it needs to be distinguished from other visual features in a single locale. Furthermore, there are other methods of encoding the ID of a visual feature in a scene such that this is not a required step associated with every embodiment of the invention. In a specific embodiment of the invention, the distances between the feature points are hashed and used as a distinctive ID for the registered visual feature such that they can be recalled and the tag can be identified at a later time. The hashing step can also be optional in that the ID can be derived from the distances or other features of the measures or image.

In specific embodiments of the invention, the ID could be derived from a priori knowledge of the planned deployment location of the visual feature. For example, in certain applications, multiple identical instantiations of a visual feature may be registered for use as fiducial elements. In particular, a team insignia or company logo may be placed in numerous locations in a given locale. In these embodiments, the ID of the visual feature could be derived from the proximity of the feature to another easily detectable visual feature in the locale. In the case of sports arenas with fixed imager positions, the ID could also be detected based on the approximate pose of the camera at the time which the visual features was captured by the imager. In specific embodiments, various versions of a company logo, or different brand or company logos, can be used to provide a unique signature for identification information directly. Furthermore, in certain applications, specific IDs for visual elements are not needed as the system can instead register the specific location of visual elements relative to each other and solve for the identification of specific visual elements when enough of them are detected by a single imager.

Flow chart section 200 also includes an optional step 208 of training a network to detect visual element 250. The network can be a trainable directed graph such as an artificial neural network (ANN). The network can be trained to identify the feature points of the visual element from an image of the locale or object in which the visual element is located. The training procedure can include the generation of training data with various lighting conditions, perspectives, occlusions, and transforms. The generation of training data can also include applying random homographies to a planar visual element. In specific embodiments, feature points, such as feature points 270 will be selected such that they can be readily detected using standard computer vision feature detection routines. However, a network can be trained to detect a wide array of feature points under a broad array of distortions in terms of perspective, lighting, and other variations that would not generally be detectible using traditional methods. In addition, and as alluded to previously, the design and training of the network could be conducted in tandem with the design and optional training of the system used to select feature points in step 203 such that the feature points used to register the visual item were feature points that were optimized for detection by the network under various conditions.

A network can recognize an image itself and visual elements in an image and provide the location of the visual element in various ways. In a specific embodiment, the network could be designed to detect N objects. The input of the network could be an encoding of the image and an output could be a "1" at a specific location in the vector if the object was present and all else zero. The output could also provide location and/or pose information. For example, the output could be an N×m matrix identifying the precise location and pose of an object where m could be six units in size representing x-, y-, and z-coordinates as well as pitch, yaw, and roll. The output could also be the x- any y-coordinates of at least four points with known relative measures on the object, and, so long as the pose of the image was known, the precise location and pose of the visual element could be derived therefrom. In situations where the visual elements were planar, the output could also be an N×m matrix where m could be eight units and contain homography values for the visual element with the last homograph value normalized to 1. The homography values could be the values of a 3×3 homograph matrix for the visual element.

Flow chart section 210 includes various steps associated with the deployment of a visual feature that was registered to serve as a fiducial element in flow chart section 200. Flow chart section 210 commences with a step 211 of placing the visual feature. The visual feature can be placed in a locale or on a subject that will be captured by an imager along with the fiducial element. As mentioned previously, this step can be conducted prior to registering the visual element if the visual element is an inherent aspect of the locale or subject, such as a textured wall, a car's hood ornament, or a painting mounted on the wall of a room.

Flow chart section 210 continues with a step 212 of capturing an image of the subject or in the locale. The step can be conducted using the same imager used in step 202. Using the same imager can make repeat detection of the feature points somewhat easier but is not an essential step as even the same imager can have its characteristics altered over time. Regardless, the captured image can then be analyzed by a computerized system, either using traditional computer vision algorithms or trained networks. The analysis can include the execution of step 213 in which the pose of the visual feature is derived, from the image of the visual feature in the locale, using the set of measures registered in flow chart section 200. This step can involve a network trained in step 208 identifying the feature points or deriving the pose from the feature points, or both. The pose of the visual feature can then be used for any of the approaches mentioned above with reference to traditional fiducial elements with encoded geometric information. The pose can be further refined using photogrammetry in which an initial pose is used to align a known model of a captured object with an image of the object using an optimization algorithm.

Flow chart section 210 additionally includes an optional step 214 of deriving a unique identification of the visual feature. The ID can be the ID registered in step 205. As with the generation of the ID, the detection of the ID can use the measures, or it can use an alterative system such as by intuiting the ID from the relative location or other visual features, a priori information regarding the camera pose relative to the locale, or other computer vision techniques which were used to determine the ID in step 205.

Figure 6:
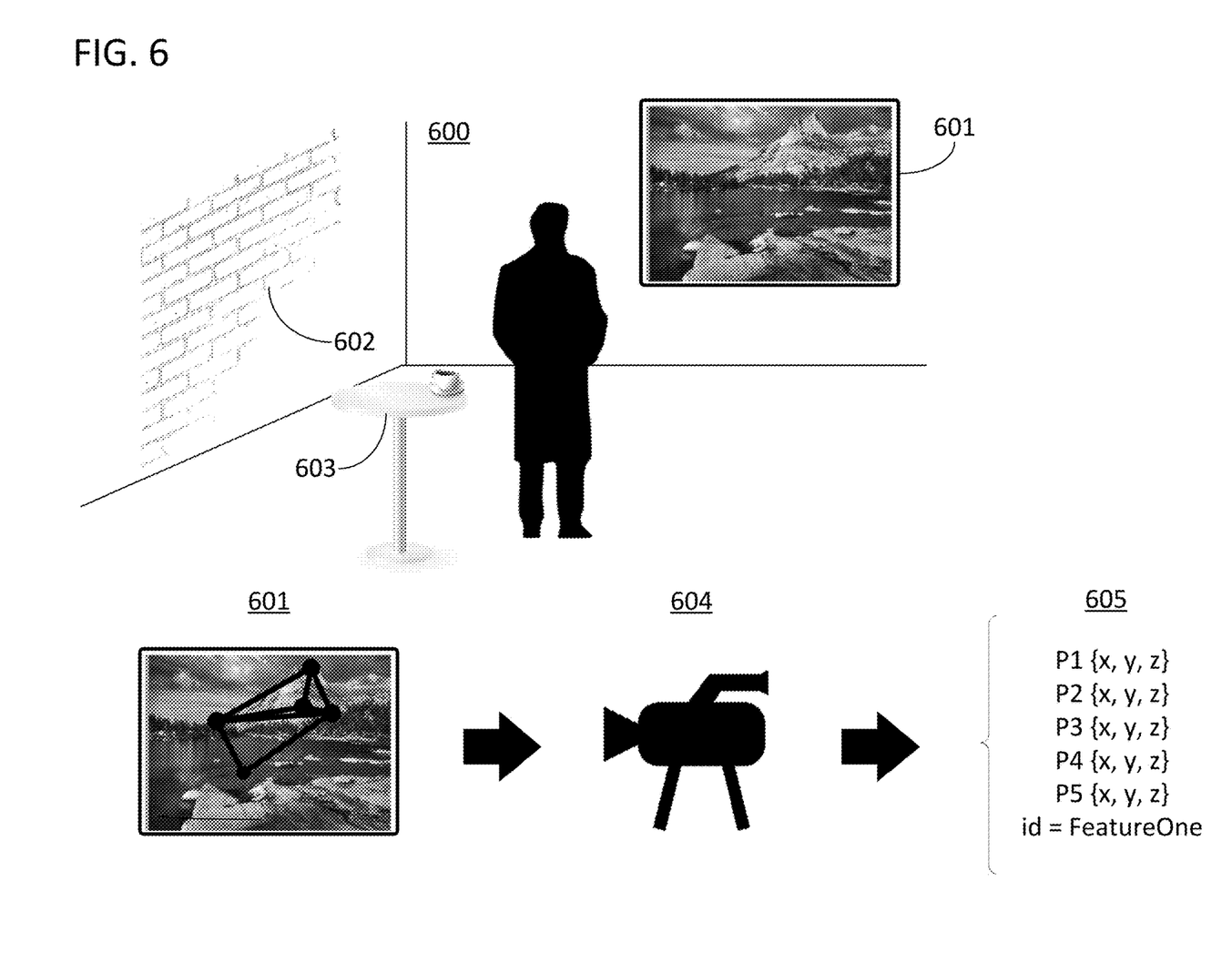
FIG. 6 is an illustration of a locale with fiducial elements that have been registered in accordance with specific embodiments of the invention.

Using the approaches disclosed herein, visually unobtrusive fiducials can be utilized in a locale such that they do not require post processing removal and do not present a distraction to an observer viewing the locale at the same time as a capture with the fiducials is conducted. FIG. 6 illustrates a locale 600 with registered visual features 601, 602, and 603. As seen, these visual features can be naturally occurring elements of the scene instead of large posters with distracting black and white patterns. However, an imager 604, can still derive geometric information 605 from these visual features, such as visual feature 601, in the same way that information was derived from AprilTag 100 in FIG. 1 because the measures, and potential descriptions of the feature points, associated with visual feature 601 have been registered and stored for later use as an encoded fiducial element.

While the specification has been described in detail with respect to specific embodiments of the invention, it will be appreciated that those skilled in the art, upon attaining an understanding of the foregoing, may readily conceive of alterations to, variations of, and equivalents to these embodiments. While the example of a visible light camera was used throughout this disclosure to describe how a frame is captured, any sensor can function in its place to capture a frame including depth sensors without any visible light capture in accordance with specific embodiments of the invention. Any of the method steps discussed above, with the exception of the aligning and placing steps which involve physical manipulations of the visual features or geometric reference object, can be conducted by a processor operating with a computer-readable non-transitory medium storing instructions for those method steps. The computer-readable medium may be memory within a personal user device or a network accessible memory. Modifications and variations to the present invention may be practiced by those skilled in the art, without departing from the scope of the present invention, which is more particularly set forth in the appended claims.

What is claimed is:
1. A computer-implemented method comprising:
aligning a fiducial tag with a logo;

capturing, while the fiducial tag and the logo are aligned, an image of the fiducial tag and the logo;

identifying, in the image and using an automatic feature detector, a set of at least four non-colinear feature points in the logo;

deriving, from the image, a coordinate system using the fiducial tag; and providing a set of measures to each of the points in the set of at least four non-colinear feature points using the coordinate system.

2. A computer-implemented method comprising:

aligning a geometric reference object and a visual feature;

capturing, while the geometric reference object and the visual feature are aligned, an image of the geometric reference object and the visual feature;

identifying, in the image of the geometric reference object and the visual feature, a set of at least four non-colinear feature points in the visual feature;

deriving, from the image of the geometric reference object and the visual feature, a coordinate system using the geometric object; and providing a set of Euclidean measures to each of the points in the set of at least four non-colinear feature points using the coordinate system.

3. The computer-implemented method of claim 2, further comprising:

placing the visual feature in a locale;

capturing an image of the visual feature in the locale using an imager; and deriving, from the image of the visual feature in the locale and using the set of Euclidean measures, a pose of the visual feature in the locale or the imager in the locale.

4. The computer-implemented method of claim 3, further comprising:

generating, using data associated with the set of at least four non-colinear feature points, a unique identifier for the visual feature; and determining, from the image of the visual feature in the locale, the unique identifier for the visual feature.

5. The computer-implemented method of claim 2, wherein:

the geometric reference object is a two-dimensional fiducial tag;

the visual feature is two-dimensional; and the aligning step is conducted by placing the two-dimensional fiducial tag and the visual feature proximate to each other on a surface.

6. The computer-implemented method of claim 5, wherein:

the capturing step is conducted using a single visible light camera.

7. The computer-implemented method of claim 2, further comprising:

identifying, in the image of the geometric reference object and the visual feature, an alignment feature of the geometric reference object and an alignment feature of the visual feature;

the geometric reference object is a three-dimensional object;

the visual feature is three-dimensional; and the aligning step is conducted by placing the three-dimensional object and the visual feature: (i) proximate to each other; (ii) on a surface; and (iii) with the first alignment feature of the three-dimensional object and the first alignment feature of the visual feature located on a plane that is normal to the surface.

8. The computer-implemented method of claim 7, wherein:

the capturing step is conducted using a hero visible light camera and a witness visible light camera; and the image includes depth information derived from the hero visible light camera and the witness visible light camera.

9. The computer-implemented method of claim 2, wherein:

the visual feature is a two-dimensional picture with a nonrecurrent texture map.

10. The computer-implemented method of claim 2, wherein:

the visual feature is a two-dimensional asymmetrical picture.

11. The computer-implemented method of claim 2, wherein:

the geometric reference object is a regular two-dimensional array of two-dimensional fiducial tags;

the image consists of a set of pixels spaced according to a set of pixel receptors of an imager used to capture the image; and the set of at least four non-colinear feature points are sub-pixel locations relative to the set of pixels.

12. The computer-implemented method of claim 2, wherein:

hashing data associated with the set of at least four non-colinear feature points to generate a unique identifier for the visual feature;

placing the visual feature in a locale;

capturing an image of the visual feature in the locale; and identifying, from the image of the visual feature in the locale, the unique identifier for the visual feature.

13. The computer-implemented method of claim 12, wherein:

the data associated with the set of at least four non-colinear feature points is the Euclidean measures.

14. The computer-implemented method of claim 2, wherein the visual feature is a first visual feature and the set of at least four non-colinear feature points is a first set of at least four non-colinear feature points, the method further comprising:

registering a second visual feature using the geometric reference object to provide a second set of Euclidean measures to a second set of at least four non-colinear points using the coordinate system;

hashing data associated with the first set of at least four non-colinear feature points to generate a first unique identifier for the first visual feature;

hashing data associated with the second set of at least four non-colinear feature points to generate a second unique identifier for the second visual feature;

placing the first visual feature and the second visual feature in a locale;

capturing an image of both the first visual feature and the second visual feature in the locale; and identifying, from the image of both the first visual feature and the second visual feature in the locale, the first unique identifier for the visual feature and the second unique identifier for the second visual feature.

15. The computer-implemented method of claim 2, wherein the identifying is conducted using an automatic feature detector and a network trained to select points for maximum detectability.

16. The computer-implemented method of claim 2, wherein the Euclidean measures are distances to at least two other points in the set.

17. The computer-implemented method of claim 2, wherein the Euclidean measures are distances to a common point in the set.

18. The computer-implemented method of claim 2, further comprising:
- training a network to segment and identify the visual feature in any image;
- placing the visual feature in a locale;
- capturing an image of the visual feature in the locale; and
- deriving, from the image of the visual feature in the locale, a pose of the visual feature in the locale using the set of Euclidean measures and the network.

19. The computer-implemented method of claim 2, wherein:
- the geometric reference object is a two-dimensional fiducial tag; and
- the visual feature is a logo.

20. A non-transitory computer-readable medium storing instructions for executing a method comprising:
- aligning a geometric reference object and a visual feature;
- capturing, while the geometric reference object and the visual feature are aligned, an image of the geometric reference object and the visual feature;
- identifying, in the image of the geometric reference object and the visual feature, a set of at least four non-colinear feature points in the visual feature;
- deriving, from the image of the geometric reference object and the visual feature, a coordinate system using the geometric object; and
- providing a set of measures to each of the points in the set of at least four non-colinear feature points using the coordinate system.

* * * * *